MULTIAPERTURE CORE MEMORY MATRIX

Filed May 1, 1963

INVENTORS:
ALBERT ZARETSKY
OTTAVIO C. CATALDO
BY Howson & Howson
ATTYS.

United States Patent Office 3,289,181
Patented Nov. 29, 1966

3,289,181
MULTIAPERTURE CORE MEMORY MATRIX

Albert Zaretsky, Brooklyn, and Ottavio C. Cataldo, East Northport, N.Y., assignors to American Bosch Arma Corporation, Garden City, N.Y., a corporation of New York Filed May 1, 1963, Ser. No. 277,254
14 Claims. (Cl. 340—174)

Figures 1, 2, 3, 4, 5, 6, 7:
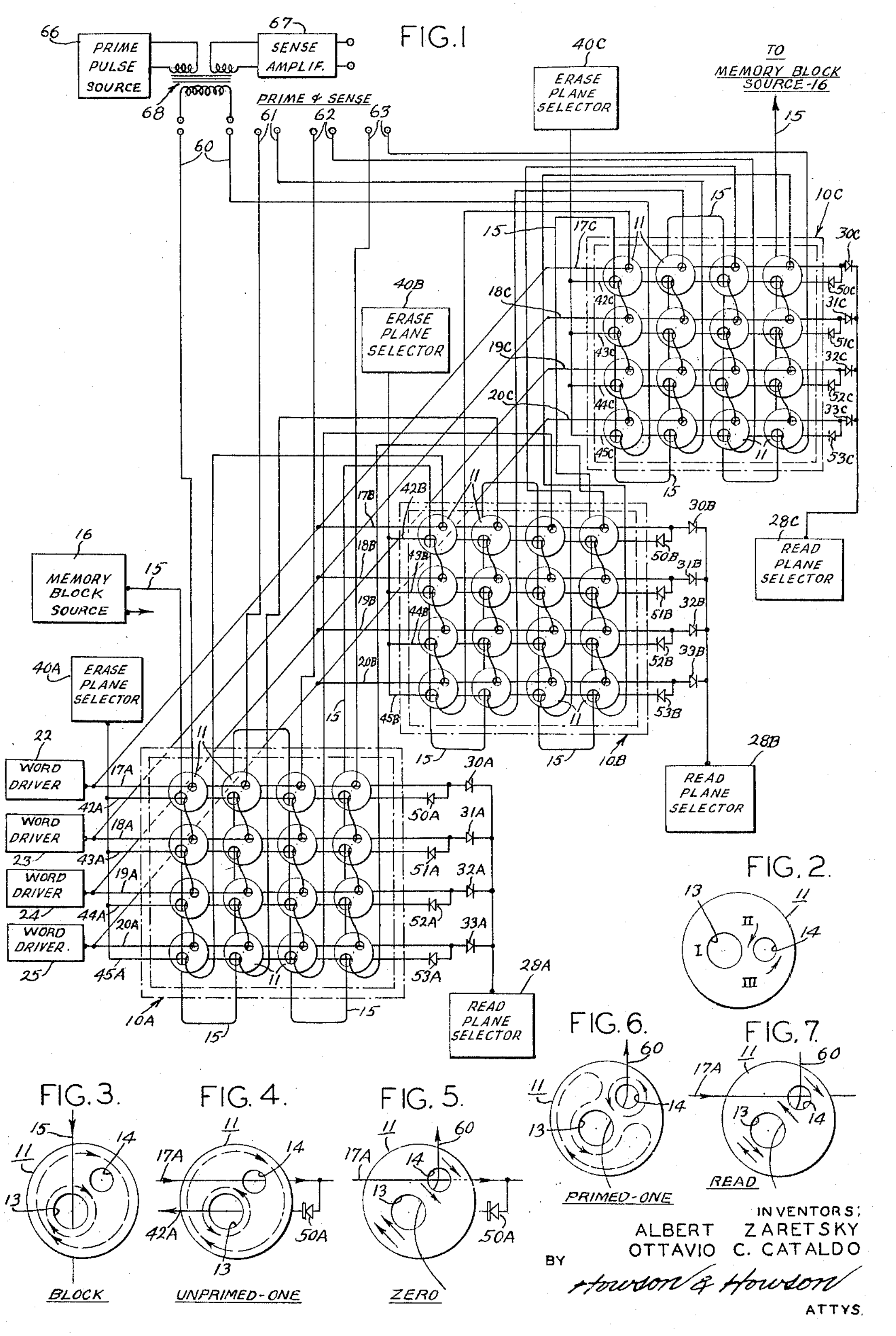

This invention relates to apertured magnetic-core apparatus and to methods for operating such apparatus, as well as to computer memory systems using such apparatus and methods.

Memory elements and memory systems suitable for use in computers exist in the prior art in a large variety of forms. In general, in binary digital computers each of the memory elements used is characterized by two identifiably-different states into either of which it can be placed by applied information signals usually consisting of the presence or absence of an electrical pulse of predetermined minimum amplitude, the absence of a pulse indicating a ZERO and the presence of a pulse representing a ONE in a binary digital code. One broad form of such memory element which has recently found wide acceptance in the art comprises an annular ferrite core of substantially square hysteretic properties and high retentivity together with a plurality of electrical conductors passing through the core, so arranged that sufficient driving current passing through a selected first one of the conductors in one direction will produce magnetic saturation of the core in a given geometric sense while the opposite direction of current passage will produce the opposite sense of magnetic saturation. Because of its high retentivity, the core remains in the state in which it is so placed after the driving current has ceased. The direction of the current through the first conductor is made to depend upon whether a ZERO or a ONE is represented in the information signal, so that the sense of the static remanent flux in the core at any time constitutes storage of either a ZERO or a ONE of the information signal. Such actuation of the ferrite core to its ONE or ZERO state in response to the occurrence of a ONE or ZERO of the information signal is commonly termed "write-in." The magnetic state of the ferrite core may be identified at any later time by a process termed "read-out," in which a read-out current is passed in a predetermined direction through one of the conductors threaded through the core. If the direction of the read-out current is such as will produce a ONE state in the core, and the core was previously storing a ZERO, the resultant change of magnetic state of the core induces a voltage in another of the conductors threaded through the core; if the core was previously in the ZERO state, it remains so during read-out and no output voltage is produced. The presence or absence of a read output therefore indicates the storage state of the particular core. In such a system the read-out process destroys the stored information so that, if it is to be made available again, special steps must be taken to re-insert it later, and hence this form of read-out is termed "destructive."

While such simple annular ferrite cores have been used with a certain degree of success in the memory units of computers, the destructive read-out which characterizes their use constitutes a serious limitation in many applications, especially where frequent and rapidly-repetitive access to the stored information is desired. While in some cases the destroyed information can be re-stored, this usually requires additional equipment and complexity of operation and, importantly, decreases the speed at which information can be repetitively retrieved from the memory system.

In addition, where such memory elements are incorporated in large number in a complete memory system designed to perform the normally requisite memory functions, further problems arise. One such important memory function is write-in and read-out selection, which is a procedure for assuring that predetermined ones of the information-signal elements or "bits" are effective to write information into predetermined corresponding ones of the memory elements and for assuring that read-out signals can be applied to any pre-selected one or group of memory elements to produce read-out information therefrom. The usual method of providing selection in the prior art is termed "coincident current" selection, and involves associating each memory element with a particular group, such as a pair, of conductors which thread the selected element. To operate the chosen element, as for write-in or read-out, currents are passed simultaneously through both of the identifying wires, each wire of the pair carrying a part only of the current required to actuate the memory element. For example, a pair of identifying conductors may produce actuation of the selected element by each carrying slightly more than half the total current required for actuation; if either or both currents are absent, that particular element is not actuated. This coincident-current method of selection makes critical the intensity of the current passed through each identifying wire, since the current through either wire of the pair must never be large enough to actuate any memory element by itself, yet the total of the currents through the two identifying wires must always be large enough to assure actuation. Furthermore, since the magnetic properties of ferrite cores vary substantially with temperature, the values of actuating currents which are required at one operating temperature will be ineffective to operate the memory properly when the temperature varies appreciably.

More recently there has been proposed for use in memory systems a special type of ferrite core which uses magnetic material similar to that of the above-described simple annular ring, but which has an importantly different geometry. In particular, the core has two apertures instead of one; for example, it may have the form of a ferrite disk with two spaced apertures extending through the thin dimension of the disk, one aperture preferably being larger in diameter than the other. By passing electrical current through different conductors threading the two apertures, a number of different types of magnetic flux paths may be established in the magnetic disk, and, by changing the currents through the conductors, magnetic flux may be switched between different portions of the disk. In particular, a strong current through the larger aperture produces a generally circular saturation flux in a predetermined sense around the large aperture and throughout the disk. In this condition the core is said to be "blocked" since, for reasons indicated hereinafter, substantial currents in either direction through the smaller aperture are unable to produce any appreciable change in the magnetic flux surrounding the smaller aperture. However if, following blocking of the core, a current of opposite sense and lesser intensity than the blocking current is passed through the larger aperture, the core is "set" so that the flux around the smaller aperture may be reversed repetitively in sense by repetitive reversal of the current through the smaller aperture.

It has been proposed in the prior art that such a bi-apertured core be used as a binary memory element in which the blocked condition represents a ZERO, for example, while the unblocked or "set" condition represents a ONE. In the read-out process a current passed through the smaller aperture of a blocked core produces no substantial flux change in the core and hence induces no output in another conductor threaded through the smaller aperture. However, current through an unblocked or "set" core produces a reversal of flux around the smaller aperture and thereby induces a read output voltage in another conductor threading the smaller aperture. A subsequent current in the opposite direction through the read-out inducing conductor will then return the flux around the smaller aperture to its former condition so that the stored information is regained, and in this sense the memory is non-destructive.

The selection system proposed by the prior art for use in such a non-destructive bi-apertured core memory is of the usual current-coincidence type. For example, two conductors may be passed through the larger aperture of each core so that only when the sum of the currents through the two conductors exceeds a first predetermined level does the core become blocked, and so that only when the sum of the currents through the two wires is in the opposite direction and less than said first predetermined level, but greater than a second predetermined level, the core is placed in its "set" condition. Setting and read-out typically involve similar selection by current coincidence.

While such a current-coincidence type of bi-apertured core memory system can provide non-destructive read-out, it is at least as critical as the earlier memory systems utilizing simple annular cores with respect to the intensities of the currents employed and with respect to the permissible range of operating temperatures, since again relatively small discrepancies in the currents used can upset the magnetic flux conditions required for operation.

In U.S. Patent No. 3,048,828 issued August 7, 1962 and entitled Memory Device there is described one type of nondestructive magnetic memory plane using flux cancellation in multi-apertured cores to reduce the criticality of the system and to provide other desirable features.

It is an object of our invention to provide a new and improved arrangement of a binary-storage memory element of the class which employs a ferrite core having two apertures therein and having a plurality of conductors passing through each of its two apertures, and to provide a novel method for operating such a memory element.

Another object is to provide such an improved memory element in which, by the passage of non-critical currents through particular ones of the several conductors, binary information can be stored and read out non-destructively.

A further object is to provide a new and improved memory system including a plurality of our novel memory elements, by means of which binary information can be stored in selected ones or selected groups of said memory elements and can be read out non-destructively from selected ones or selected groups of the memory elements, and which is substantially less critical than prior art systems for performing similar functions with respect to the required intensities of operating currents and with respect to the permissible range of operating temperatures of the system.

Still another object is to provide such a system in which selected ones or groups of memory elements can be selectively erased and returned to a reference condition suitable for the application of new information for storage.

It is another object to provide such a system in which the various memory elements are connected effectively in horizontal rows and vertical columns, each row of the array of memory elements storing a logical grouping of bits of information designated herein as a "word," in which system information may be stored one bit at a time and read out or erased one word at a time.

A further object is to provide a system of the last-described type comprising a plurality of separate planes of memory elements, the memory elements of each plane being arranged in the above-described row-and-column configuration, and in which write-in, read-out and erasure may be produced selectively for any desired word in any of the planes.

It is also an object to provide an improved high-speed, random-access, memory system of the word-organized or word-oriented class employing bi-apertured ferrite cores as memory elements, which system operates with a wide range of permissible currents and through a wide range of temperatures, and requires a minimum of wires and circuit components.

These and other objects of the invention are achieved by the provision of a novel bi-apertured ferrite-core memory element and system comprising conductors extending through the two apertures in each core, in which the different magnetic flux states of the core required for the various memory functions are determined primarily by the manner in which the conductors thread the apertures and by the particular combinations of currents passed through the various sets of said conductors, rather than by the exact intensities of the currents in the conductors as in the prior art. In this sense, the core is operated by flux coincidence, rather than by the current coincidence of the prior art, and hence is non-critical as to current intensities and operating temperatures. In addition, the sequence of flux states produced in a memory element in performing the various memory functions differs from that of the prior art so as to provide for flux-coincidence operations throughout the system as well as for non-destructive read-out.

More particularly, a preferred form of memory element in accordance with the invention comprises a bi-apertured ferrite memory core in the form of a disk having one of its apertures larger than the other, two conductors extending through the larger of the two apertures, another conductor extending through the smaller aperture, and an additional conductor threaded through both apertures in sequence and in opposite directions with respect to the plane of the disk. While it is preferable that our memory element utilize this number of conductors in order to provide all of the functions of the particular complete memory system with respect to which the invention is described in detail later herein, it will be understood that the arrangement and operation of less than all of the conductors in some instances embodies the invention in certain of its aspects.

To operate such an individual memory element, one of the conductors extending through the larger aperture is preferably supplied from a controlled source of current pulses, designated hereinafter as the memory block source. An intense pulse of current passed through this conductor serves to block the core, the intensity of the pulse being non-critical so long as it exceeds a predetermined level. This blocking step is performed only when the memory element is first used, and/or when the information in all of a large number of such elements is to be entirely replaced. Prior to storing a ZERO or a ONE therein, the memory element is "set" to its "unprimed-one" or "one-set" condition, by passing a current through one of the conductors which threads only the larger aperture, hereinafter designated as the "erase" conductor, in the direction opposite to that of the previously blocking current, while simultaneously passing a current through the conductor which threads only the smaller aperture, hereinafter designated as the "read" conductor, in the direction opposite to that flowing through the larger aperture. Preferably these two currents are equal in intensity, and in fact the same current is preferably passed through both apertures by electrically connecting one end of the "read" wire to one end of the "erase" wire and passing a current through them in series. With this arrangement the setting current is non-critical so long as it is sufficiently large to produce the desired amount of setting, since the current through the smaller aperture produces a magnetic effect in the surrounding core region which is in a direction to prevent the current through the larger aperture from producing undesired over-setting or reverse blocking of the core.

To store a ZERO in the memory core, two of the conductors are again energized; in this case a current is passed through the "read" conductor in the same direction as in the previous setting step, while at the same time a current is passed through the conductor which threads both apertures in opposite directions, designated hereinafter as the "prime and sense" conductor. The latter current flows through the smaller aperture in a direction opposite to that of the current in the "read" conductor. The effect of these two currents is to cause the core to revert to its blocked state. The currents used are not critical so long as they are both sufficiently large and so long as the current through the "prime and sense" conductor is roughly equal to that through the "read" conductor. A ZERO is represented by this blocked state of the core, while a ONE is represented by the previously-produced "set" state of the core.

Before producing "read-out" of the condition of the core, a priming current pulse is first passed through the "prime and sense" conductor in the same direction as that used for inserting a ZERO in the core. If prior to priming the core was in the ONE state the effect of the priming pulse is to reverse the sense of magnetic flux in the core around the smaller aperture, while if the core was in the ZERO or blocked state the priming pulse has no effect. The intensity of the priming current is not critical so long as it is sufficient to reverse the flux around the smaller aperture.

To provide read-out of the state of the core, a current pulse is passed through the "read" conductor in the same sense as is used in the original setting of the core and in producing a ZERO state therein. The effect of this read-out pulse on a primed-one core is to reverse the sense of magnetic flux around the smaller aperture of that core, thereby inducing a pulse in the "prime and sense" conductor which is used as a read-out indication of ONE storage. If the core was storing a ZERO, the read-out pulse has no effect since the core is blocked, and no read output is produced. The intensity of the read-out pulse is not critical so long as it is sufficiently large to reverse the flux around the smaller aperture since it can have no substantial effect on the flux elsewhere in the core.

The read-out is non-destructive because, although the read-out current reverses the direction of the flux around the smaller aperture, application of another priming pulse in the same manner described previously will return the core to its ONE state if it originally stored a ONE, and will not affect the core if it is in the ZERO state. Accordingly, it is only necessary to precede each read-out by a priming pulse.

If it is desired to erase the information stored in the core and to prepare for the insertion of new information, it is only necessary to energize those conductors utilized in the one-set operation described previously thereby returning the core to its one-set condition.

Accordingly, binary information storage, non-destructive read-out and erasure are provided in such manner that the currents utilized are not critical, and therefore so that the memory element is operative over a wide range of temperatures.

Further in accordance with the invention, the above-described memory element and its mode of operation may be embodied in a large-scale memory system which performs all the functions of a high-speed, random-access word-oriented memory system with a minimum of circuitry and while retaining the non-criticality of current and operating temperature characteristic of the individual memory elements. In such a word-oriented memory system, the memory elements are preferably arranged effectively in horizontal rows and vertical columns in a plurality of memory planes, each row of each plane corresponding to a different word. The blocking pulse conductor threads the larger aperture of all cores in the same direction so that blocking of the entire system may be provided when desired by a single pulse from a memory block source. The smaller apertures in each row of each of the memory planes are threaded in the same direction by a separate "read" conductor for each row, a separate word driver being used to supply current to corresponding "read" wires in the various planes; for example, one word driver supplies the "read" wires for the first rows of all planes. The ends of all of the "read" wires for a given plane are connected in common, at their ends remote from their word driver, to a read-plane selector associated with that plane by way of an electronic switching arrangement. By actuating a selected word driver a given row in all planes is selected, and by simultaneously actuating the read-plane selector associated with one of the planes the row which is in that plane is selected.

Each row of each plane is also threaded by an "erase" conductor extending through the larger core apertures, one end of each "erase" conductor of a given plane being connected through the electronic switching circuit to the "read" wire of the corresponding row. The other ends of all "erase" wires in a given plane are connected in common to an erase plane selector associated with that plane. By energizing the erase plane selector for a given plane along with a given word driver, current can be caused to flow in any preselected row of the entire array through the smaller apertures in one direction and back through the larger apertures of the cores of that row in the opposite direction, as is desired in providing the one-set and erasing operations for all the cores of a given word, in the manner described hereinbefore.

In addition, "prime and sense" conductors used for ZERO write-in, for priming and for sensing are threaded in sequence up and down through the small and large apertures of the cores in corresponding rows of the several planes, one conductor for the first column of all planes and other conductors for each of the other columns. To write ZERO's into a given word, the corresponding word driver and plane selector are operated to pass current through the selected "read" wires and a current is simultaneously passed through the "prime and sense" conductor which threads the column containing the core into which the zero is to be read. To prime the system and ready it for read-out, all of the "prime and sense" conductors are energized, so that any selected word may then be read out. To provide read-out of any given word, the corresponding word driver and plane selector are actuated to pass a current through the "read" conductor of the word to be read. The read-out voltage is induced in the same "prime and sense" conductors previously used for priming. Simultaneous separate output indications of the presence of ZERO's and ONE's in the selected word are thereby produced by the several "prime and sense" conductors.

Erasure of any given word may be accomplished selectively by the actuation of the same wires and elements described with reference to the one-set operation.

Accordingly, there is provided a simple, non-critical, word-oriented, random-access memory system using a minimum of wires and components and capable of providing selective write-in of any selected word, selective read-out of any selected word, and selective erasure and replacement of any selected word.

Other objects and features of the invention will be more fully appreciated from a consideration of the following detailed description, taken in connection with the accompanying drawings, in which:

FIGURE 1 is a schematic diagram illustrating a memory system embodying the invention;

FIGURE 2 is a cross-sectional view of a typical ferrite core used in the memory elements of our memory system; and FIGURES 3, 4, 5, 6, and 7 are cross-sectional views of a typical ferrite core used in the system of the invention and showing the directions of currents passed through the cores and the magnetic flux paths thereby established in the operations of blocking, one-set or erasure, ZERO write-in, priming, and read-out respectively.

Referring now to FIGURE 1, there is illustrated therein a typical arrangement of a memory system made in accordance with the present invention. The invention contemplates the use of any practical number "*p*" of memory planes, although for simplicity only three planes, **10*a*, 10*b* and 10*c*** are shown in the drawing. Each plane may include any practical number "*m*" of horizontal rows of bi-apertured memory cores such as 11, the drawing illustrating the case in which there are four such rows for each plane. Similarly, each plane may include any practical number "*t*" of columns of cores 11, four such columns being shown in the drawing for each plane. Each core provides for the storage of one "bit" of information, and each row in each array corresponds to one word of information.

As shown in more detail in FIGURE 2, each core 11 contains two apertures 13 and 14, one of the apertures 13 preferably being substantially larger than the other. As indicated in FIGURE 2, the apertures in each core are located so as to define three legs I, II and III, leg I being situated between the larger aperture 13 and the nearest edge of the core, leg II being situated between the two apertures, and leg III being situated between the smaller aperture 14 and the edge of the core nearest thereto. Such bi-apertured cores suitable for magnetic flux switching and memory core applications are known in the art. In general, they comprise substantially square-loop hysteretic ferrite material of high retentivity, the minimum cross-sectional area of leg I preferably being at least equal to the sum of the minimum cross-sectional areas of legs II and III, which are preferably equal to one another.

Referring again to FIGURE 1, an ordinary insulated wire 15 extends from memory block source 16 through the larger aperture in each of the cores in each of the planes **10*a*, 10*b* and 10*c*, entering the larger aperture in each core from the top and threading in succession the cores of the first column of plane 10*a*, then those of the second, third and fourth columns of the same plane, after which it threads in sequence the corresponding columns of cores in planes 10*b* and 10*c* and returns to the memory block source 16. Memory block source 16 comprises conventional means for passing a pulse of current through wire 15** whenever the source is energized by other elements of the computer or manually.

The smaller apertures 14 in the first horizontal row of cores in plane **10*a* are threaded in sequence by the insulated "read" wire 17*a*, which enters through the top of each successive core in the row; the smaller apertures in the second horizontal row of cores, of plane 10*a* are similarly threaded by a "read" wire 18*a*, and "read" wires 19*a* and 20*a* thread the smaller apertures of the third and fourth horizontal rows of cores in plane 10*a* in a similar manner. One end of "read" wire 17*a* is connected to word driver 22, and "read" wires 18*a*, 19*a* and 20*a* are similarly connected, respectively, to word drivers 23, 24 and 25. The other ends of "read" wires 17*a*, 18*a*, 19*a* and 20*a* are connected to read plane selector 28*a* by way of diode rectifiers 30*a*, 31*a*, 32*a* and 33*a***, respectively.

Word driver 22 is also connected to the "read" wire **17*b* which threads in sequence and from the top the smaller apertures of the first horizontal row of cores in plane 10*b*, and to wire 17*c* which similarly threads the smaller apertures of the first horizontal row of cores in plane 10*c*. The other word drivers 23, 24 and 25 are connected respectively to "read" wires 18*b*, 19*b*, and 20*b* of plane 10*b* and to "read" wires 18*c*, 19*c* and 20*c* of plane 10*c*. The latter "read" wires are threaded through the cores of corresponding rows in planes 10*b* and 10*c* in the same manner as in plane 10*a*. The ends of "read" wires 17*b*, 18*b*, 19*b* and 20*b* at the opposite side of plane 10*b* from the word drivers are connected through separate diode rectifiers 30*b*, 31*b*, 32*b* and 33*b*, respectively, to a common read plane selector 28*b*. Similarly, the "read" wires 17*c*, 18*c*, 19*c* and 20*c* of plane 10*c* are connected at their ends remote from the word drivers to a read plane selector 28*c* by way of the several rectifying diodes 30*c*, 31*c*, 32*c* and 33*c***.

An "erase" wire **42*a* is threaded in sequence through the larger apertures of each core in the first horizontal row of plane 10*a*, entering the bottom of each core in progressing from right to left. "Erase" wires 43*a*, 44*a* and 45*a* are similarly threaded through the larger apertures of the cores in the second, third and fourth rows of plane 10*a*. The ends of the "erase" wires 42*a*, 43*a*, 44*a* and 45*a* shown at the left in the figure are all connected together and to the erase plane selector 40*a*. The right-hand ends of these wires are connected to the corresponding right-hand ends of "read" wires 17*a*, 18*a*, 19*a* and 20*a*, respectively, by way of the respective diode rectifiers 50*a*, 51*a*, 52*a* and 53*a*. Similarly in the case of plane 10*b*, the "erase" wires 42*b*, 43*b*, 44*b* and 45*b* are threaded through the larger apertures of the cores 11 of different ones of the four rows of cores, the left-hand ends of the "erase" wires being connected in common to the erase plane selector 40*b*, while the right-hand ends of the "erase" wires are connected to the "read" wires 17*b*, 18*b*, 19*b* and 20*b*, respectively, by way of the respective diodes 50*b*, 51*b*, 52*b* and 53*b*. In plane 10*c* the "erase" wires 42*c*, 43*c*, 44*c* and 45*c* are similarly threaded through the larger apertures of the cores in each row, the left-hand ends of these "erase" wires being connected to erase plane selector 40*c* and the right-hand end of these wires being connected to the right-hand ends of the corresponding "read" wires of plane 10*c* by way of the respective diodes 50*c*, 51*c*, 52*c* and 53*c***.

The above-described arrangement of word drivers, read plane selectors, erase plane selectors and switching diodes is such that by applying suitable voltages to the various selectors and drivers a positive current can be passed through any selected "read" wire from its corresponding word driver to the read plane selector associated with that plane. For example, "read" wire **17*a* of plane 10*a* is energized by the application thereto of a positive pulse from word driver 22 simultaneously with the generation of a negative pulse by read plane selector 28*a*, which causes switching diode 30*a* to become forward-biased and causes current to flow through "read" wire 17*a* only, all other "read" wires in the entire array remaining non-conductive. Similarly, an erasing current can be caused to flow through any selected "read" wire of any row of any plane and then back through the associated "erase" wire, by again actuating the appropriate word driver while energizing the erase plane selector associated with that plane, rather than the read plane selector. For example, such a current may be established in the first row of plane 10*a* by applying a positive pulse at the output of word driver 22 and simultaneously energizing only erase plane selector 40*a* to produce therefrom a negative voltage which, together with the positive voltage produced by driver 22, forward-biases diode 50*a* rather than diode 30*a* so that the current through "read" wire 17*a* flows back through "erase" wire 42*a* to erase plane selector 40*a*, rather than to read plane selector 28*a***. This particular current path is utilized for the one-set operation or for erasing any given word. The functions of producing appropriately timed and directed pulses at the word drivers, read plane selectors and erase plane selectors are readily provided by apparatus well-known in the computer art, and hence need not be described in detail here.

Also provided are a number of "prime and sense" wires equal to the number of columns in each plane. In the present example there are four such wires 60, 61, 62 and 63. "Prime and sense" wire 60 threads all of the core apertures in the first vertical column of each plane. Thus, wire 60 enters the smaller aperture of the upper left-hand core of plane 10a from the top of the core, enters the larger aperture of the same core from the bottom and then is similarly threaded in sequence through the smaller and larger apertures of all of the cores in the left-hand column of plane 10a. The wire 60 then continues to thread in sequence the smaller and larger apertures of the left-hand column of plane 10b and of the left-hand column of plane 10c. In an alternative wiring arrangement, the "prime and sense" wire 60 may be threaded downward through all of the smaller apertures of the left-hand column of a given plane and then up through all the larger apertures of the left-hand column of cores, instead of down and up through a single core at a time as shown.

In like fashion, the "prime and sense" wire 61 is threaded through all the apertures of all the cores in the second vertical columns of cores in all of the planes 10a, 10b and 10c. "Prime and sense" wires 62 and 63 respectively are similarly threaded through the third and fourth vertical columns of cores in all planes.

"Prime and sense" wires 60, 61, 62, and 63 are therefore disposed so that by applying a voltage between the two ends of a selected one of these wires a current can be passed through any selected digit column of all of the planes, as is desired in the ZERO write-in operation, and so that by applying similar voltages to all of the "prime and sense" wires, a current can be passed through all of the apertures of all of the cores in all arrays, as is desired in the priming operation. In addition, each separate wire 60, 61, 62 and 63 serves as a sensing wire for producing between its ends any output voltage generated during the read-out process.

To accomplish these purposes, each of the "prime and sense" wires is connected at its ends to a priming pulse source which generates voltage pulses at times controlled by the timing and logic circuits of the computer in which the memory is used, and also to a sense amplifier for receiving any "read" output signals and for amplifying them for delivery to any desired portion of the computer. One such arrangement suitable for connection to the ends of each of the "prime and sense" wires is shown in the drawing for the case of wire 60, and it will be understood that similar apparatus may be connected to each of the other "prime and sense" wires 61, 62 and 63. As shown, a priming pulse source 66 and a sense amplifier 67 are electrically connected to the ends of "prime and sense" wires 60 through a three-winding transformer 68, the prime pulse source 66, the sense amplifier 67 and the "prime and sense" wire 60 each being connected to a different one of the three windings. It will be understood that the sense amplifier 67 should be disabled at least during priming pulse times or its output made ineffective during those times, since the priming pulse will produce an input to the sense amplifier through the transformer 68. This may be accomplished by well-known strobing techniques, and for example may be simply accomplished by merely gating on the output of sense amplifier 67 only during the application of read-out pulses to the memory system.

Considering now the operation of the memory system in FIGURE 1, the various wires are normally energized in the definite sequence and manner now to be described in detail.

First of all, the memory block source 16 is energized to produce a uni-directional current pulse flowing downward through the larger aperture of all cores, as indicated by the arrowhead in FIGURE 3. So long as a sufficiently-large block current pulse is used, saturated magnetic flux paths indicated by the arrows in FIGURE 3 are set up in all of the cores of the entire memory system, the direction of the arrows in FIGURE 3 indicating the direction of magnetic flux in the corresponding region. It will be seen that the flux extends in continuous closed circles and in a clockwise direction around the larger aperture 13 throughout the core, so that the flux through the legs II and III on both sides of the smaller aperture 14 is in the same direction. This operation places all cores in a definite reference condition and blocks all cores in the entire memory so that substantial currents in either direction through the smaller aperture 14 are unable to produce any substantial change in the flux in the cores. This is because any flux induced by current through a smaller aperture 14 would have to lie along a line completely encircling aperture 14, and therefore would have to produce an increase in flux in either leg II or leg III. Since the flux in legs II and III is already saturated, no such increase can be produced and therefore the core is blocked. This blocking pulse need only be used in a memory system which has never been used before, or when the entire previous contents of the memory are to be changed and rewritten as by external tape or keyboard, for example. Because the cores are all driven to the saturated state by the blocking current this current is non-critical, larger currents being unable to exert any further effect on the cores.

Next, the cores corresponding to the word into which new information is to be written are all subjected to a setting operation which places each of them in a state designated herein as the "unprimed-one" state or "one-set," since such cores can be made to store a ONE by the application of a later priming pulse. This "one-set" operation is accomplished by energizing the erase plane selector associated with the plane containing the word to be acted upon, concurrently with energization of the word driver for the selected word. For example, to select the cores of the top row of plane 10a in the "one-set" operation, word driver 22 and erase plane selector 40a are energized concurrently. The result of this selection is to pass a current pulse downward through the smaller apertures of all of the cores of the selected word, and upward through the larger apertures of each of the selected words. This produces in each of the cores of the selected word the flux conditions indicated in FIGURE 4. As shown, the current flowing upwardly through the larger aperture of each core 11 produces a counter-clockwise flux pattern immediately around the larger aperture 13, which reverses the direction of flux in leg II between the two apertures. The larger the upward current the greater the extent of the region of reversed flux direction, and, in arrangements of the prior art, if the upward current is made too large it may reverse all of the flux in the core and produce a reverse blocked condition rather than a "one-set" condition. However, in the arrangement of the invention the equal current simultaneously flowing downward through the smaller aperture 14 tends to produce a clockwise flux around the smaller aperture, and therefore enhances the desired reversal of flux in the center leg II but opposes and prevents reversal of the flux in the outer leg III. Accordingly, the "one-set" operation for producing an "unprimed-one" core is non-critical as to current so long as the current is sufficient to produce the desired reversal of saturation flux in the center leg II. The same considerations apply to all of the cores of the selected word.

Next, information is inserted into the selected word by writing ZERO's into the appropriate cores of the word while leaving unaffected those cores which are to represent ONE's. This is accomplished by energizing the word driver and the read plane selector associated with the word to be affected and simultaneously passing a pulse of current through each of those "prime and sense" wires which correspond to the columns containing digits in which a ZERO is to be written. The current through the "prime and sense" wires is made larger than that through the "read" wires. FIGURE 5 illustrates the currents flowing while writing in a ZERO in the upper left-hand core of plane 10a, for example. The current through the "prime and sense" wire 60 flows downwardly through the larger aperture 13 and upwardly through the smaller aperture 14, as indicated by the arrowhead on the wire, while the current through the "read" wire 17a flows in the same direction as for the previous "one-set" operation. No current flows through the erase wire in this process. Using a sufficiently large current through wire 60, the result of this operation is to produce again a blocked condition of the cores as indicated by the magnetic flux directions shown by the arrows. In changing the flux state from that shown in FIGURE 4 to that shown in FIGURE 5 the effects of the read current through wire 17a are counteracted by the simultaneously occurring current through wire 60, and the magnetic effects of the two currents cancel effectively around the smaller aperture. Accordingly, the resultant current is essentially through the larger aperture only, resulting in the blocked ZERO state represented in FIGURE 5. The currents used are not critical so long as they are sufficiently large and the current through the "prime and sense" wires is larger than that through the "read" wires.

Thus, the write-in operation is performed by selection of a word by the energizing of a word driver and plane driver combination and simultaneously energizing the appropriate "prime and sense" wires which traverse the cores in which ZERO's are to be produced, while not energizing the "prime and sense" wires wherever a ONE is to occur. The cores 11 of the selected word are therefore left with either the flux pattern of FIGURE 4 or that of FIGURE 5, which correspond to an "unprimed-one" and a ZERO, respectively. After the first selected word has been written a similar sequence of operations may be performed with respect to the next selected word, and so on until the information for each word has been inserted.

To ready the memory system for word read-out the "prime and sense" wires 60, 61, 62, and 63 are momentarily energized to pass a current downward through the larger aperture and upward through the smaller aperture of each of the cores of the memory system, as represented in FIGURE 6 with respect to one of the cores. This will cause reversal of the direction of flux around the smaller aperture of each "one-set" core having the flux pattern shown in FIGURE 4, resulting in the flux pattern shown in FIGURE 6 which is a kidney-shaped pattern representing the "one-primed" state of the core, and will create no change in the cores which were in the ZERO or blocked state since in the latter case the flux in legs II and III is in the same direction and saturated, so that no circular flux can be established around the smaller aperture. The priming pulses are applied to all "prime and sense" wires and to all cores, and hence will prime all digits of all words simultaneously.

Read-out of any selected word is accomplished by energizing the appropriate "read" wire to pass a current downward through the smaller apertures of each of the cores of the selected word, as represented in FIGURE 7. For example, to read out the top word in plane 10a, word driver 22 and read plane selector 28a are simultaneously energized. In each of the "one-primed" cores of the word to be read, the read current produces a flux reversal around the smaller aperture thereby inducing a voltage in the "prime and sense" wire which threads that core. However, no flux reversal is produced in the ZERO-set cores since they are blocked and hence no voltage is induced in the "prime and sense" wires threading those cores. Each of the primed-one cores of the selected word therefore produces an output voltage across the ends of its associated "prime and sense" wire. These read output voltages are supplied to appropriate sense amplifiers such as 67 during read-out times, as described earlier. The sensings of all "bits" of the selected word occur simultaneously, resulting in a parallel read-out system. The intensity of the read-out current is not critical so long as it is large enough, since it can only reverse the flux around the smaller aperture.

Since the read-out current produces a reversal of flux around the smaller aperture of the "primed-one" cores, after read-out these cores return to their "unprimed-one" condition shown in FIGURE 4, while the ZERO-set cores remain in the blocked condition shown in FIGURE 5. If another read pulse is then applied directly to the same word, no sense output will result since the flux around the smaller aperture is already saturated in the direction which the read-out current tends to produce, while the ZERO-set cores are blocked and hence will not respond to read-out current at all. However, the stored information has not been lost since only the flux around the smaller aperture has been disturbed by read-out, and passing a subsequent priming pulse through the smaller aperture restores the flux around it to its "primed-one" condition so that it may be read out again. While priming must precede any read operation, priming may be applied at any time without upsetting the memory. The priming pulses prime the entire memory regardless of how many words have been read.

The diodes associated with each plane enable the above-described switching between "one-set" and read-out current conditions, and provide electrical isolation between the various words by eliminating all return paths for the read and erase currents, except those through the selected word.

Erasure of any selected word may be provided by merely operating the appropriate word driver and erase plane selector to return all cores of the word to the "one-set" condition, afer which new information may be inserted into the erased word.

As explained previously, in no case is the intensity of the current used in any of the above-described functions critical, so long as it is large enough to produce the desired operation and, in the case of ZERO write-in, so long as the "prime and sense" current is approximately equal to the read current. Economy of wiring is provided by the use of various of the wires for more than one function. Accordingly, there has been provided a high-speed, random-access, word-oriented memory system for rapid storage and retrieval of binary information which uses a small number of wires, in which the read-out is non-destructive, and in which the currents and the operating temperatures used are not critical.

Although a particularly advantageous manner of threading the various wires through the core apertures has been described, other threading arrangements producing the same directions of currents may be used instead. The directions of all currents may also be reversed, together with appropriate reversal of the polarities of the diode switching elements. It will also be understood that while the entire system embodies all of the features and advantages of the invention, some of the advantages and features are embodied in the arrangement and operation of various limited portions of the entire system, which are useful in themselves.

While the invention has been described with particular reference to a specific embodiment thereof, it will be understood that it may be embodied in any of the large variety of forms without departing from the scope of the invention as defined by the appended claims.

We claim:

1. Memory core apparatus comprising:
a plurality of magnetic cores each having a first relatively larger aperture and a second relatively smaller aperture;
a first conductor threading all of said first apertures in sequence in the same sense;
a second conductor threading all of said second apertures in sequence in the same sense;
means for applying a potential of a given polarity to one end of said second conductor with respect to its other end to pass a current through said second conductor;
switch means for connecting one end of said first conductor to said other end of said second conductor when said switch means is closed; and
means for applying to the other end of said first conductor a potential, with respect to said one end thereof, which is of a polarity opposite to said given polarity while said switch means is closed to pass a common current through said first and second conductors.

2. Apparatus in accordance with claim 1, in which said switch means comprises a first diode and a second diode and means for rendering said first and second diodes alternately conductive.

3. Memory core apparatus comprising:

a plurality of magnetic cores each having a first relatively larger aperture and a second relatively smaller aperture;

a first conductor threading all of said first apertures in sequence in the same sense;

a second conductor threading all of said second apertures in sequence in the same sense;

a third conductor threading all of said first apertures in sequence in the same sense;

additional conductors each threading a different one of said cores and passing through both of said apertures therein in opposite senses;

means for passing a first pulse of current through said third conductor in a given direction with respect to each core to produce throughout each of said cores a magnetic flux extending around said first aperture therein in a given circular sense thereby to block each of said cores;

means for connecting one end of said first conductor to one end of said second conductor and for passing a second pulse of current through said first conductor and second conductor in series in a direction opposite to said given direction in said first conductor, while said cores are blocked, to reverse the direction of magnetic flux around said first apertures, thereby to place all of said cores in an un-primed one state;

means for passing a third pulse of current through each of a selected group of said additional conductors and for simultaneously passing a fourth pulse of current through said second conductor in said given direction with respect to said cores, said third pulse of current flowing through said smaller apertures in a direction opposite to said fourth pulse of current, thereby to set those of said cores threaded by said selected group of conductors in a ZERO state for which said last-named cores are blocked by a flux extending about said first apertures thereof in a circular sense opposite to said given circular sense;

means for passing a fifth pulse of current through each of said additional conductors after said last-named cores are set in said ZERO state, said fifth current pulse being in the same direction as said third current pulse, thereby to leave said ZERO-set cores in said ZERO-state while setting all others of said cores in a one-primed state for which the circular sense of flux around said second aperture is opposite to that for said un-primed one state; and means for passing a sixth pulse of current through said second conductor in the same direction as said second current pulse therein and after the occurrence of said fifth pulse, to induce a voltage change in those of said additional conductors other than said selected group thereof, thereby to provide read-out of the state of said plurality of cores.

4. In a memory system:

a plurality of bi-aperture ferrite cores inter-connected effectively in a pattern of horizontal rows and vertical columns, each of said cores containing a relatively larger aperture and a relatively smaller aperture;

a plurality of first conductors each threading the larger apertures of one of said rows of cores;

a plurality of second conductors each threading the smaller apertures of one of said rows of cores;

a plurality of electronic switch means each providing a switch connection between one end of one of said plurality of first conductors threading aperatures of a given one of said rows and one end of that one of said plurality of second conductors which threads apertures of said given row;

a plurality of current pulse sources each connected to the other end of one of said plurality of first conductors; and first selector circuit means connected to the other ends of all of said plurality of second conductors for controllably closing all of said plurality of switch means to pass current from each of said sources through its associated first conductor and second conductor in series.

5. The system of claim 4, comprising also second selector circuit means connected to all of said switch means for controllably interrupting said switch connection and for passing current from each of said sources through its associated first conductor.

6. In a memory core system:

a plurality of magnetic cores connected effectively in a pattern of horizontal rows and vertical columns, each of said cores containing a relatively larger aperture and a relatively smaller aperture;

a plurality of first conductors each threading said smaller apertures of a different one of said rows of cores;

a plurality of second conductors each threading said larger apertures of a different one of said rows of cores;

a plurality of first diode devices, each associated with a different one of said rows of cores, one terminal of each of said diodes being connected to one end of said first conductor of said associated row, and the other terminal of each of said diodes being connected to one end of second conductor of said associated row;

driver circuits associated with each of said rows, the other ends of said first conductors being connected to different ones of said driver circuits; and a plane selector circuit, the other ends of said second conductors being connected to said selector circuit.

7. Apparatus in accordance with claim 6, comprising a second plane selector circuit and a plurality of second diode devices severally connected between said second plane selector and said one ends of said first conductors.

8. Apparatus in accordance with clai m7, comprising a plurality of third conductors each threading in opposite directions the smaller and larger apertures of a different one of said columns of cores, and a fourth conductor threading the larger aperture in each of said plurality of magnetic cores.

9. Apparatus in accordance with claim 6, comprising a plurality of third conductors each threading in opposite directions the smaller and larger apertures of a different one of said columns of cores, and a fourth conductor threading the larger aperture in each of said plurality of magnetic cores.

10. In a device of the character described:

a plurality of memory planes comprising a plurality of magnetic cores, said cores of each of said planes being arranged in a pattern of rows and columns, each of said cores having a relatively larger aperture and a relatively smaller aperture therein;

a plurality of first conductors each associated with a different one of said rows of cores of said plurality of planes and each threading the smaller apertures of its associated row;

a plurality of second conductors each associated with a different one of said rows of cores of said plurality of planes and each threading the larger apertures of its associated row;

a plurality of first diodes, each associated with a different one of said rows of cores and each connected between one end of the first conductor and one end of the second conductor which thread apertures of its associated rows;

a plurality of driver circuits each connected to the other ends of a set of said first conductors, different conductors of said set threading rows of cores in different ones of said planes; and a plurality of erase plane-selector means each associated with a different one of said planes and each connected to the other ends of those of said second conductors which thread cores of the plane associated therewith.

11. Apparatus in accordance with claim 10, comprising a plurality of second diodes each associated with a different one of said rows of cores, a plurality of read plane-selector means each associated with a different one of said planes, and means connecting each of said read plane-selector means to said one ends of those of said first conductors which thread cores of the plane associated with said each plane-selector means.

12. Apparatus in accordance with claim 10, comprising a plurality of third conductors each threaded in opposite directions through the smaller and larger aperture of each core in a different set of said columns of cores, each of said last-named sets including columns of cores in each of said planes, a plurality of prime pulse sources, and a plurality of sensing devices, each of said third conductors being connected to a different one of said prime pulse sources and to a different one of said sensing devices.

13. Apparatus in accordance with claim 12, comprising a fourth conductor threaded through the larger aperture in each of said cores in each of said planes, and a source of blocking pulses connected to said fourth conductor.

14. In a device of the character described:

a plurality of bi-apertured ferrite cores arranged in a pattern of horizontal rows and vertical columns, each of said cores containing a relatively larger aperture and a relatively smaller aperture;

a plurality of first conductors each threading the smaller apertures of a different one of said rows of cores;

a plurality of second conductors each threading the larger apertures of a different one of said rows of cores;

first diode each associated with a different one of said rows of cores and each connected between one end of the first conductor and one end of the second conductor which thread cores of the row with which said each diode is associated;

a plurality of driver circuits each connected to the other end of a different one of said first conductors;

a first plane selector circuit connected to the other ends of said second conductors;

a second plane selector circuit;

second diodes each associated with a different one of said rows of cores and each connected between said second plane selector and said one end of said first conductors which threads cores of the row associated with said each second diode;

a plurality of third conductors each threading in opposite directions said larger and said smaller apertures of a different one of said columns of cores;

a fourth conductor threading said larger aperture of each of said plurality of cores;

a source of blocking pulses;

a plurality of prime pulse sources connected to different ones of said third conductors;

a plurality of sensing circuits; and means for selectively energizing said first, said second, said third and said fourth conductors to establish magnetic flux patterns in said cores.

References Cited by the Examiner

UNITED STATES PATENTS

| | | | |
|---|---|---|---|
| 3,007,140 | 10/1961 | Minnick et al. | 340—174 |
| 3,234,527 | 2/1966 | Korkowski | 340—174 |

BERNARD KONICK, *Primary Examiner.*

S. URYNOWICZ, *Assistant Examiner.*